United States Patent
Gurvich et al.

(10) Patent No.: US 11,371,549 B2
(45) Date of Patent: Jun. 28, 2022

(54) FASTENER JOINTS WITH ENHANCED STRENGTH FOR COMPOSITE COMPONENTS

(71) Applicant: Hamilton Sundstrand Corporation, Charlotte, NC (US)

(72) Inventors: Mark R. Gurvich, Middletown, CT (US); Brayton Reed, Rome, NY (US); Joyel M. Schaefer, Earlville, NY (US); Michael King, Sauquoit, NY (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/072,482

(22) Filed: Oct. 16, 2020

(65) Prior Publication Data
US 2022/0120299 A1    Apr. 21, 2022

(51) Int. Cl.
*F16C 3/02*    (2006.01)

(52) U.S. Cl.
CPC .............. *F16C 3/023* (2013.01); *F16C 3/026* (2013.01); *F16C 2326/06* (2013.01)

(58) Field of Classification Search
CPC .......... F16C 3/023; F16C 3/026; F16C 7/026; F16C 2226/62; F16C 2326/06; F16D 1/02; F16D 1/06; Y10T 403/553; Y10T 403/6455; Y10T 403/7041; Y10T 403/7081; Y10T 403/75
USPC .................. 403/294, 337, 362, 379.1, 408.1; 464/181, 182, 183
See application file for complete search history.

(56) References Cited

U.S. PATENT DOCUMENTS

| 573,695 | A | * | 12/1896 | Penfield | F16L 37/252 285/81 |
| 4,105,346 | A | * | 8/1978 | Gelinas | F16B 7/1427 16/429 |
| 4,185,472 | A | | 1/1980 | Yates et al. | |
| 4,380,443 | A | * | 4/1983 | Federmann | F16C 3/023 464/181 |
| 5,288,109 | A | | 2/1994 | Auberon et al. | |
| 7,954,225 | B2 | * | 6/2011 | Webb | F16L 21/08 403/294 |
| 8,147,228 | B2 | * | 4/2012 | Guidry, Jr. | F04C 13/008 464/182 |

(Continued)

FOREIGN PATENT DOCUMENTS

| DE | 29708324 U1 | * | 7/1997 | ............ F16C 3/026 |
| DE | 102012223674 A1 | * | 3/2014 | ............ F16C 3/026 |

(Continued)

OTHER PUBLICATIONS

Extended European Search Report for EP Application No. 21198193.1, dated Mar. 10, 2022, pp. 8.

*Primary Examiner* — Josh Skroupa
(74) *Attorney, Agent, or Firm* — Kinney & Lange, P. A.

(57) ABSTRACT

An assembly includes a composite body and a load body connected to the composite body by a fastener. The composite body is elongate along a body axis and has a first fastener opening extending radially therethrough. The load body has a second fastener opening extending therethrough. The fastener extends along an insertion axis through the first fastener opening and the second fastener opening to connect the composite body and the first load body together. The fastener has a non-circular cross-section orthogonal to the insertion axis.

20 Claims, 10 Drawing Sheets

(56) References Cited

U.S. PATENT DOCUMENTS 9,303,682 B2 * 4/2016 Sohl .................. F16C 3/023
9,701,386 B2 * 7/2017 Marovic ............... F16D 1/02

FOREIGN PATENT DOCUMENTS

| DE | 202016004215 U1 * | 9/2016 | ............. F16C 7/026 |
| EP | 0046869 A1 * | 3/1982 | ............. F16C 3/026 |
| JP | S59137170 A | 8/1984 | |
| JP | 2015200399 A | 11/2015 | |
| WO | 2012045935 A1 | 4/2012 | |

* cited by examiner

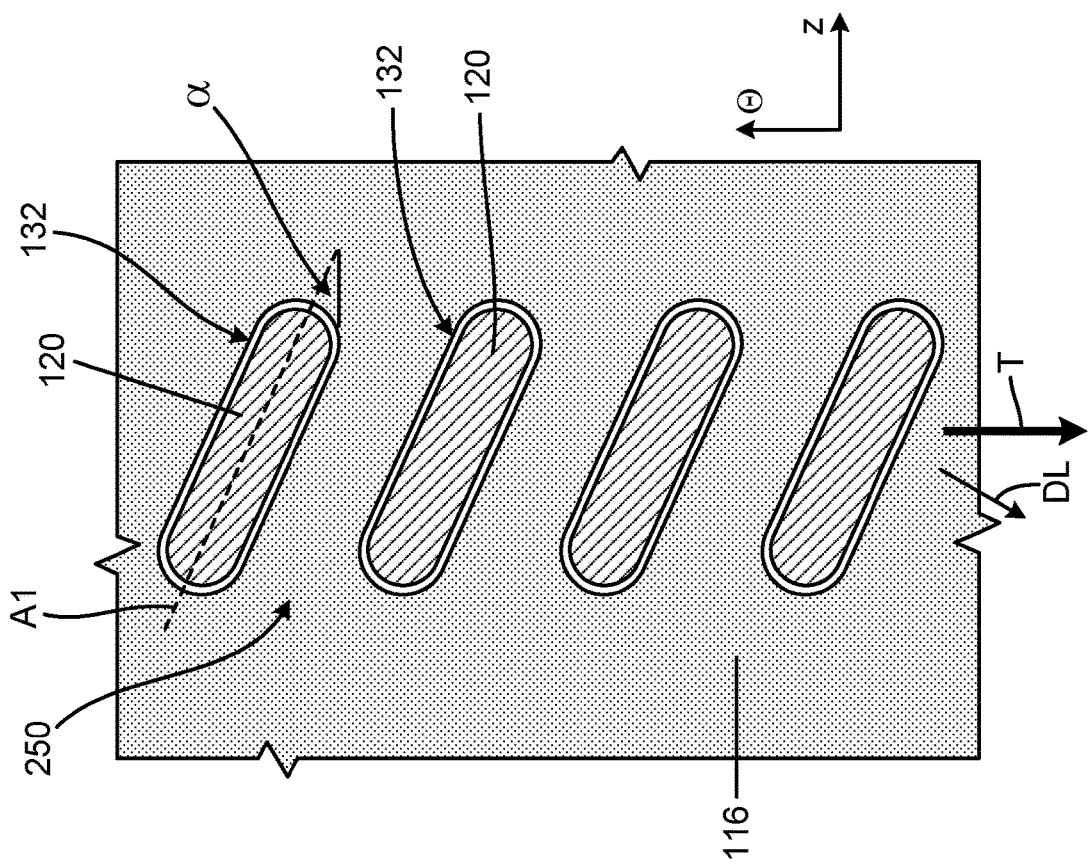
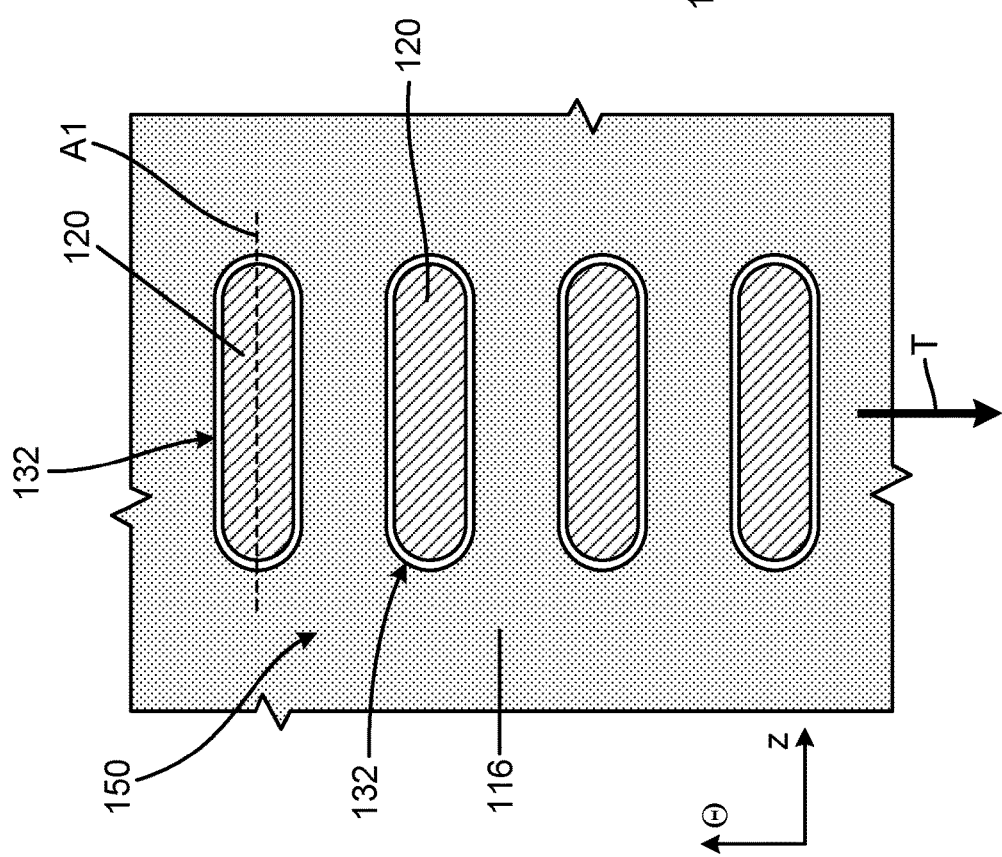

FASTENER JOINTS WITH ENHANCED STRENGTH FOR COMPOSITE COMPONENTS

BACKGROUND

This disclosure relates generally to composite structures. More particularly, this disclosure relates to fastener joints joining composite structures and support bodies. Examples of such composite structures include, among others, composite driveshafts.

Driveshafts are used to connect components to a drive input. Known applications include, but are not limited to, driveshafts for use in aerospace, nautical, and automotive applications. Driveshafts transmit primarily torque and rotation. Driveshafts are generally cylindrical bodies, which can include multiple flexible elements in series that provide bending and/or axial compliances to accommodate angular and axial misalignment and mass imbalance.

Composite driveshafts can provide increased strength and reduced weight as compared to conventional metallic designs. Polymer-matrix fiber-reinforced composite materials are often used in such applications where weight is a key concern, as composite structures are lightweight. As a representative example, composite materials are broadly used in aircraft applications, where high structural performance can be achieved by relatively low weight structures in comparison with metallic structures.

SUMMARY

According to one aspect of the disclosure, an assembly includes a composite body, a first load body, and a first fastener. The composite body is elongate along a body axis and has a first fastener opening extending radially therethrough. The first load body has a second fastener opening extending therethrough. The first fastener extends along an insertion axis through the first fastener opening and the second fastener opening to connect the composite body and the first load body together. The first fastener is configured to transmit forces between the composite body and the first load body. The first fastener has a non-circular cross-section orthogonal to the insertion axis.

According to an additional or alternative aspect of the disclosure, a method of making an assembly includes inserting one of a load body and a composite body into the other one of the load body and the composite body; forming a plurality of non-circular openings in the composite body and in the load body; installing one of a plurality of fasteners along an insertion axis and through a corresponding opening of the plurality of openings through the composite body and the load body, wherein each of the plurality of fasteners has a non-circular cross-sectional shape orthogonal to the insertion axis; and fixing the fasteners to secure the composite body to the load body.

BRIEF DESCRIPTION OF THE DRAWINGS

FIG. 7 is a cross-sectional view of a portion of a composite body including a first arrangement of a plurality of fasteners.

FIG. 8 is a cross-sectional view of a portion of a composite body including a second arrangement of a plurality of fasteners.

Figure 1A:
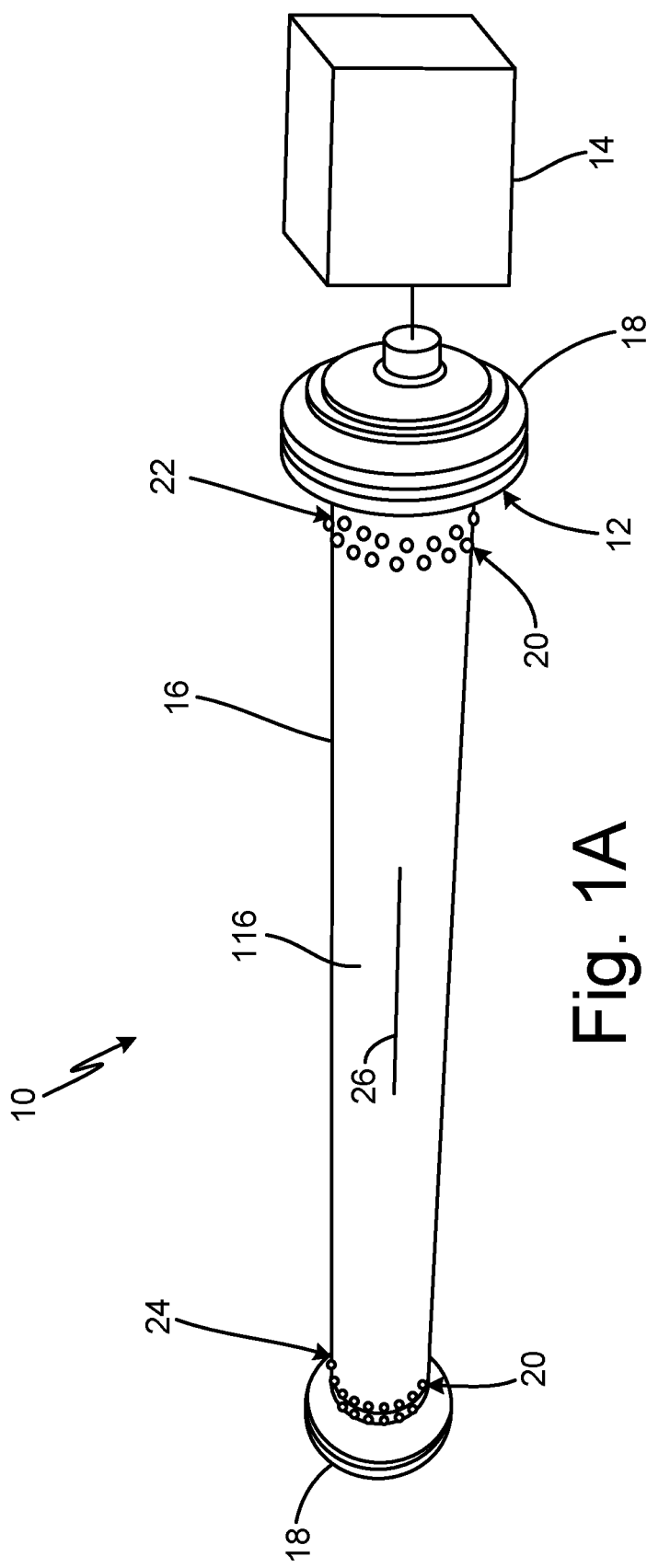
FIG. 1A is a perspective view of a prior art driveshaft system with fasteners.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The disclosure is directed to fastener joints between a composite body and a supporting body connected through the thickness of each by one or more fasteners. Examples of such joints are connections in driveshafts between a composite body and a metallic sleeve. A composite driveshaft (CDS) can include a composite body and metallic sleeve(s), with the sleeves inserted at the composite body ends inside of, outside of, or both inside and outside of the composite body. The composite body and metallic sleeves are connected by fasteners to transfer torque therebetween and for structural integrity of the CDS. Under dominant torsional load, fasteners with circular-shaped cross-sections inserted through both the composite body and the metallic sleeve(s), of prior art CDSs, were intended to resist mutual movement of the composite body and metallic sleeves. It has been shown experimentally, however, that the composite body is the weakest element of such fastener joints. Typical damage to the composite body by the circular-shaped fasteners under torsional load are areas described as being "plowed" by the circular-shaped fasteners such that the damage occurs through the entire thickness of the composite part. Another name for such "plowing" is "shear-out failure."

The disclosure describes fastener joints that include fasteners having a non-circular, cross-sectional shape and having a longer dimension placed perpendicular or generally perpendicular to the orientation or direction of the dominant load, e.g., torsional load in case of driveshafts under the most typical service conditions, due to torque. The fastener opening is non-circular to receive the non-circular fastener. The disclosed joint assembly and fasteners reduce risk of damage to the composite body at the fastener joint. Variations of the non-circular cross-sectional shape of the fastener can be used, as well as variations of the shapes and placement of holes in the composite body and metallic sleeve through which the fasteners are placed. In addition, variations of the amount of contact between the fasteners and perimeters of the holes through which they extend can be used. Further, the orientation of the fasteners and holes can be varied with respect to the axial direction of the composite body. Although the apparatus or joint is described generally with regard to a driveshaft for an engine, the joint is also contemplated to be used in other exemplary devices and between other composite objects. The joint can join a composite body with a secondary load body formed from composite or metal.

Figure 1B:
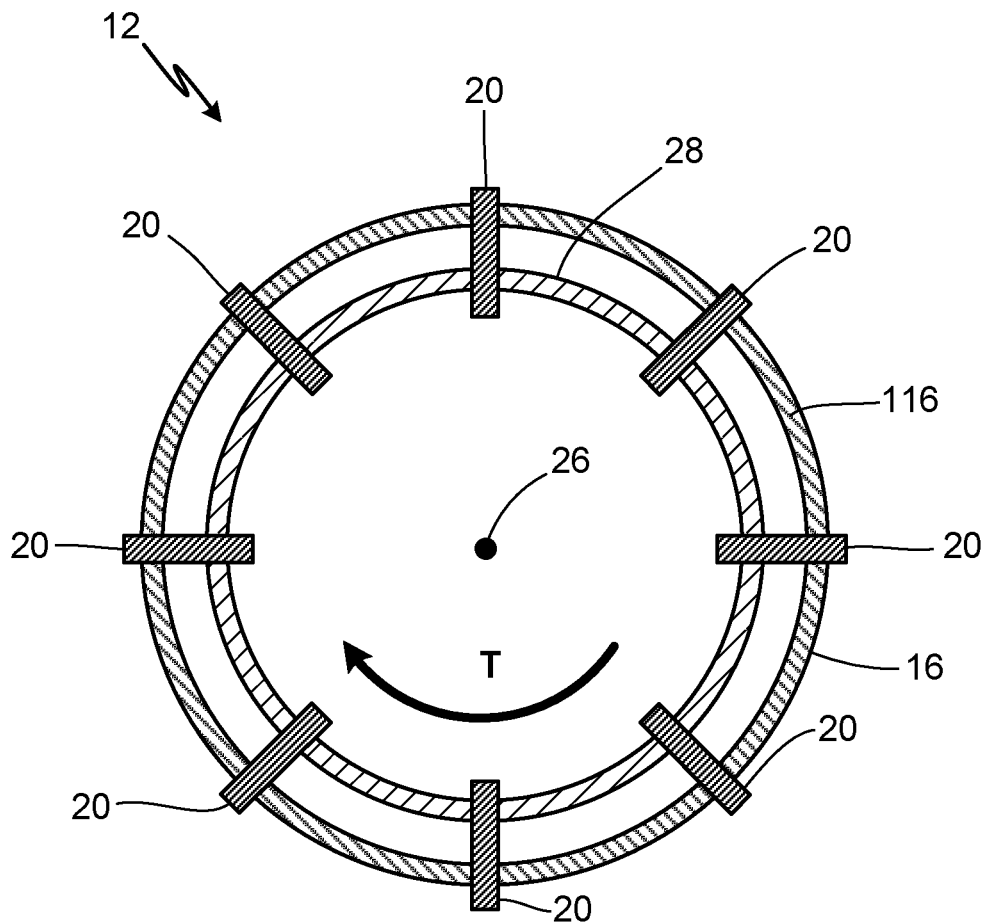
FIG. 1B is a diametric cross-sectional view of a prior art driveshaft assembly taken through a fastener joint.

FIG. 1A is a perspective view of a prior art shaft system 10. FIG. 1B is a diametric cross-sectional view of prior art shaft system 10 taken through an area including fasteners 20 or at a fastener joint. FIGS. 1A and 1B will be discussed together. Shaft system 10 includes shaft assembly 12 and drive 14. Shaft assembly 12 includes driveshaft 16, drive diaphragms 18, and fasteners 20. Driveshaft 16 includes a first end 22, second end 24, and driveshaft axis 26 (FIGS. 1A, 1B), and composite body 116. Each of drive diaphragms 18 includes diaphragm shaft 28 (FIG. 1B), which can also be referred to as a sleeve.

One of drive diaphragms 18 is attached to first end 22 of driveshaft 16 by a first array of fasteners 20. The other drive diaphragm 18 is attached to second end 24 of driveshaft 16 by a second array of fasteners 20. Fasteners 20 are circumferentially arranged about driveshaft axis 26 in one or more rows. FIG. 1A illustrates this arrangement with two rows of fasteners. The diaphragm shafts 28 of drive diaphragms 18 are concentrically aligned with driveshaft 16 and extend at least partially into driveshaft 16. Driveshaft 16 is supported at first end 22 and second end 24 by drive diaphragm shafts 28. In the example shown, drive 14 is attached to one of drive diaphragms 18. It is understood that drive 14 can be, or be representative of, an aircraft component, such as an engine, gearbox, bearing hanger, or other type of component having a driveshaft.

Driveshaft 16 is rotatable about driveshaft axis 26. At least one of drive diaphragms 18 is connected to drive 14 such that drive 14 can drive rotation of driveshaft 16 via that diaphragm 18, associated diaphragm shaft 28, and the array of fasteners 20. Drive 14 applies or transfers twist or/and torsional load (the dominant direction of which indicated by T in FIG. 1B) to diaphragm 18 such that shear force is imparted at fastener joints formed at the intersection of driveshaft 16, drive diaphragms 18, and fasteners 20. The shear force is measured to determine the load capacity of shaft test assembly 10, and specifically of driveshaft 16. Fastener joint 30 formed between fasteners 20 and driveshaft 16 is typically the portion of driveshaft assembly 12 most susceptible to damage. As such, the peak load capacity and failure point of the components of the joints, driveshaft 16, fasteners 20, and diaphragm shafts 28, are of particular importance. Driveshaft 16 can be a composite body, for example, and diaphragm shaft 28 can be a metallic or composite sleeve, for example.

Figure 2A:
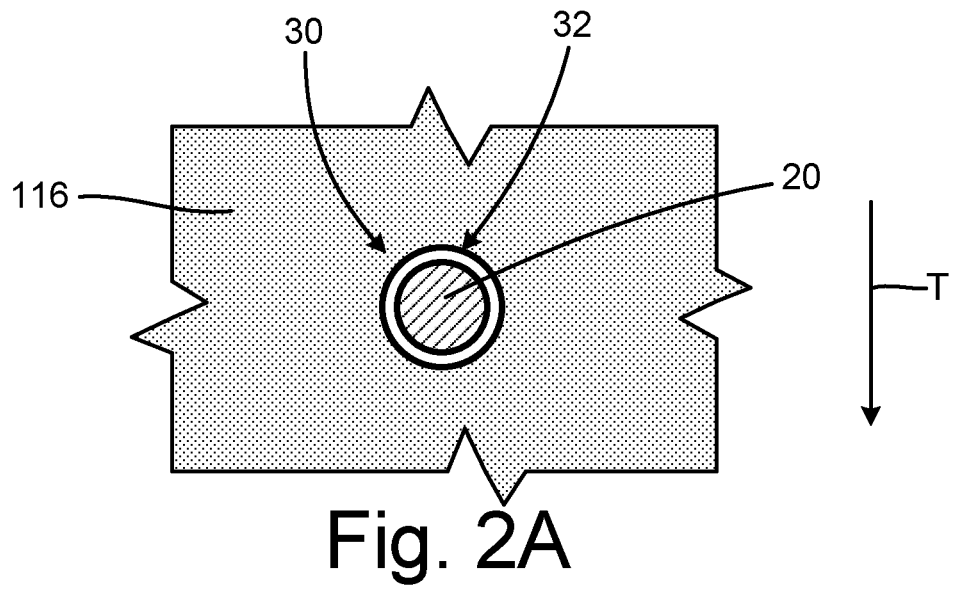
FIG. 2A is a cross-sectional view of a portion of a composite body including a prior art fastener.
Figure 2B:
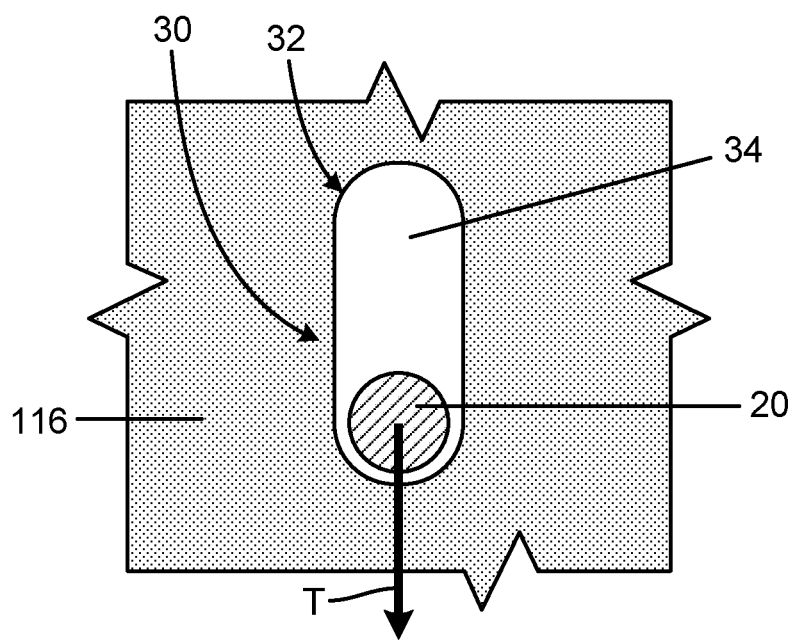
FIG. 2B is the same view of FIG. 2A after torque was applied to the composite body and prior art fastener and showing damage propagation.

FIG. 2A is a cross-sectional view showing a prior art fastener joint. FIG. 2B is a cross-sectional view showing a prior art fastener joint after damage propagation. FIGS. 2A and 2B will be discussed together.

Fastener 20 extends through fastener opening 32 formed in composite body 116 to form fastener joint 30. Fastener 20, such as, for example, a rivet or bolt, has a circular cross-section. As shown in FIG. 2A, fastener opening 32 is configured to have a similar cross-sectional shape to fastener 20 to receive fastener 20.

During operation, a load (torque or torsional load) is applied as shown by arrow T to drive rotation of driveshaft 16. The circular cross-section of fastener 20 creates a point load between fastener 20 and driveshaft 16. The point load concentrates stress at that location. Since the composite body is the weakest element in this joint, when torque is applied, the concentrated stresses can cause plowing damage to the driveshaft 16, resulting in damaged area 34 (FIG. 2B), as the metallic fastener 20 is harder than the composite driveshaft 16.

Figure 3A:
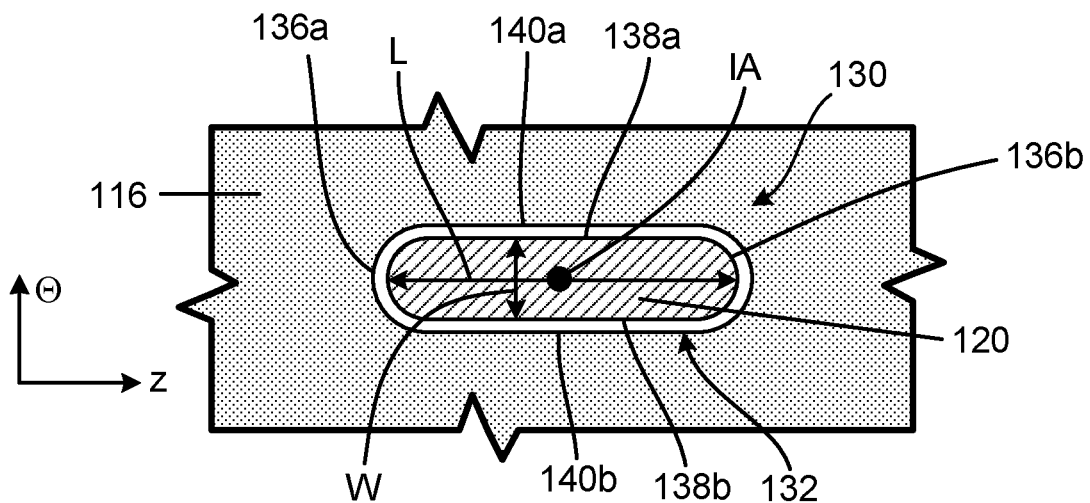
FIG. 3A is a cross-sectional view of a portion of a composite body including a first fastener.
Figure 3B:
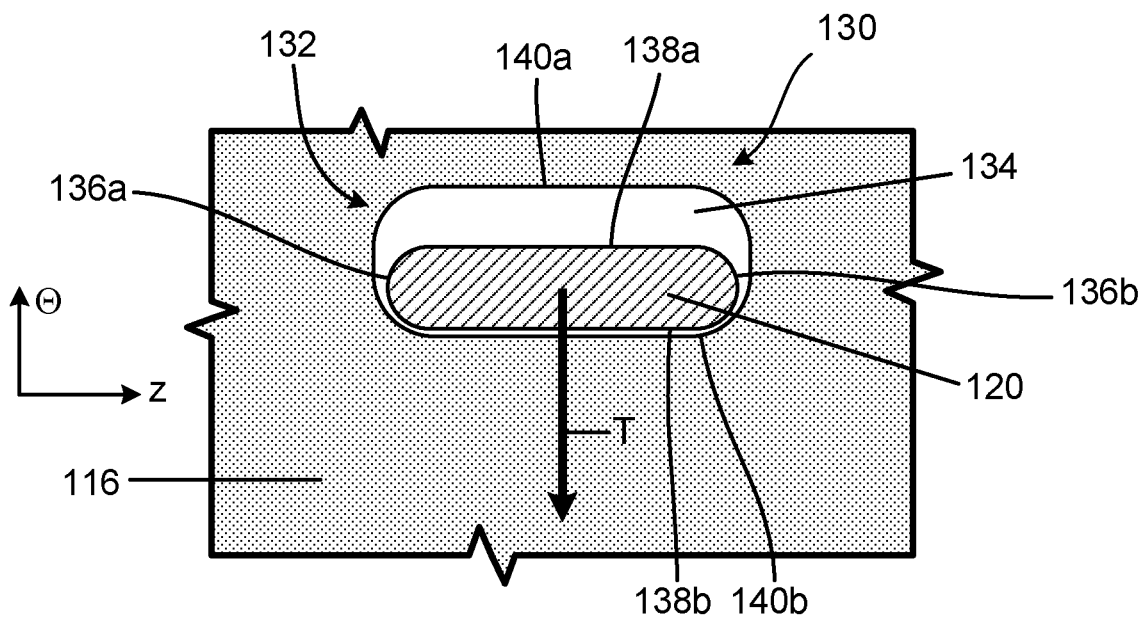
FIG. 3B is the cross-sectional view of FIG. 3A after torque was applied to the composite body and first fastener.

FIG. 3A is a cross-sectional view showing fastener joint 130. FIG. 3B is a cross-sectional view showing fastener joint 130 after damage propagation. FIGS. 3A and 3B will be discussed together. Composite body 116, fastener 120, fastener joint 130, and damaged area 134 are shown. Composite body 116 includes fastener opening 132. Fastener 120 includes lateral ends 136a, 136b and lateral sides 138a, 138b. Fastener opening 132 includes contact surfaces 140a, 140b. Composite body 116 is a portion of a composite tube that can be formed as a driveshaft, torque tube, coupling tube, among other options. Composite body 116 is configured to transmit torque and/or other forces between a first end of composite body 116 and a second end of composite body 116. For example, composite body 116 can receive rotational force at a first end, such as from drive 14 (FIG. 1A), and output rotational force at a second end, such as to a propeller, motor, shaft, among other options.

Fastener 120 extends through fastener opening 132 in composite body 116. Fastener 120 extends through fastener opening 132 along insertion axis IA. Fastener 120 has a non-circular cross-section orthogonal to the insertion axis IA. The portion of fastener 120 having the non-circular cross-section can be the shank or shaft of the fastener 120, which is the portion extending through the fastener opening 132. Fastener 120 is shown having an elongated, elliptical, oblong, or oval shape. Fastener 120 includes length L, or longer dimension, and width W, or shorter dimension, with the length L being arranged generally perpendicular to the hoop direction Θ. Length L is arranged generally perpendicular to the torque direction T.

In the example shown, fastener 120 is elongate between lateral ends 136a, 136b. In the example shown, lateral ends 136a, 136b are rounded, though other configurations are possible. Lateral sides 138a, 138b of fastener 130 are elongate in a direction z perpendicular to the hoop direction ø. In the example shown, lateral sides 138a, 138b are generally flat or planar. Lateral sides 138a, 138b can be generally perpendicular to the axis of rotation 26 (FIG. 1B) of composite body 116, as represented by directional arrow z.

Similar to fastener 120, fastener opening 132 is elongate in an orientation generally perpendicular to the hoop direction Θ. Fastener opening 132 thereby has a major (longer) dimension or axis along direction z and a minor (shorter)

dimension or axis in hoop direction Θ. In the example shown, fastener 120 is configured to have full contact with the perimeter of fastener opening 132, with each of fastener 120 and fastener opening 132 including curved ends. Fastener opening 132 is non-circular about the insertion axis IA and a shape of the fastener opening 132 is the same as the shape of the non-circular cross-section of fastener 120. In such a configuration, fastener 120 can be considered as capable of fully contacting a perimeter of fastener opening 132.

When torque is applied, as indicated by arrow T, fastener 120 resists movement of composite body 116 in the hoop direction Θ. Hoop direction Θ is thereby opposite to the direction T in which torque is applied because torque is applied to the load body by the drive and transferred to composite body 116 by fastener 120. For example, hoop direction Θ can be opposite a rotational direction of composite body 116 and direction z can be an axial direction of composite body 116.

During operation, torque is applied in direction T and fastener 120 interfaces with composite body 116 within fastener opening 132. With torque applied in direction T, stress is applied at the interface between lateral side 138b and the opposing contact surface 140b of fastener opening 132. The opposing elongate sides of fastener 120 and fastener opening 132 have a larger contact area as compared to prior art circular fasteners 20 (best seen in FIGS. 2A, 2B) and fastener openings 32 (best seen in FIGS. 2A, 2B) and distribute stresses across the length L of fastener 120. The distributed load corresponds to a lower risk of damage initiation and, with respect to damage growth, higher energy is needed to cause shear-out damage to composite body 116.

As shown in FIG. 3B, plowing damage can still occur to composite body 116 resulting in damaged area 134. However, the damaged area 134 has a smaller width in the hoop direction Θ than the damaged area 34 (FIG. 2B) caused by circular prior art fastener 20. As such, less damage is caused resulting in a longer operational life of composite body 116. Composite body 116 can also be subjected to higher stresses and loads than with circular fasteners and openings.

Fastener 120 and fastener opening 132 provide significant advantages. The configuration of fastener 120 and fastener opening 132 reduce risks of damage initiation and follow-up damage growth. In addition, a lower number of fasteners 120 can be used to secure composite body 116 to the load body. Reducing the number of fasteners 120 provides additional benefit in labor reduction and cost reduction. While fastener 120 and fastener opening 132 are discussed with regard to a composite body 116, it is understood that fastener 120 and fastener opening 132 provide advantages in other non-composite shaft structures that require strong load transfer between composite and metallic parts and where orientation of the dominant load is known.

Figure 4:
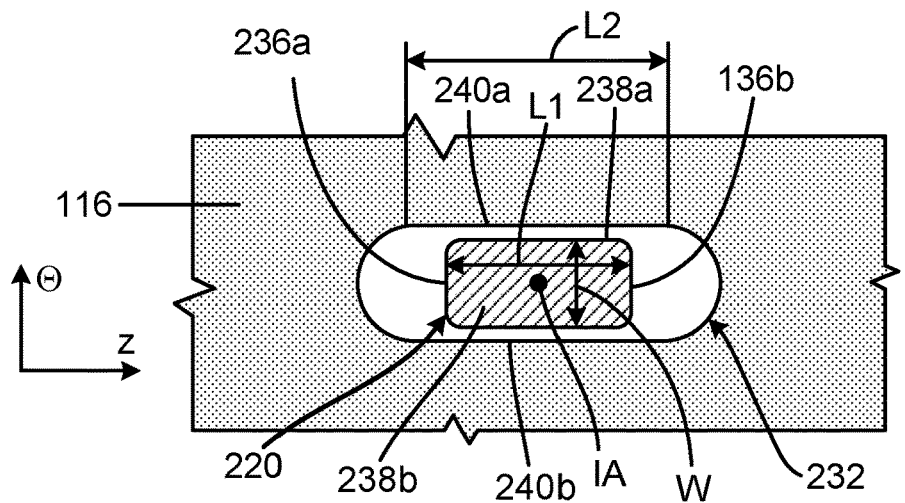
FIG. 4 is a cross-sectional view of a portion of a composite body including a second fastener.

FIG. 4 is a cross-sectional view of composite body 116 and fastener 220. Composite body 116 includes fastener opening 232. Fastener 220 is substantially similar to fastener 120 (FIGS. 3A and 3B) in that fastener 220 has a non-circular cross-sectional shape orthogonal to the insertion axis IA.

Fastener 220 includes lateral ends 236a, 236b and lateral sides 238a, 238b. Fastener 220 has a length L1, or longer dimension, and width W, or shorter dimension, with the length L1 being arranged generally perpendicular to the hoop direction Θ.

Fastener opening 232 is substantially similar to fastener opening 132 (FIGS. 3A and 3B) in that fastener 232 has a non-circular shape about insertion axis IA. Fastener opening 232 is elongate in direction z and elongate perpendicular to hoop direction Θ. Fastener opening 232 includes contact surfaces 240a, 240b that interface with lateral sides 238a, 238b of fastener 232. Contact surfaces 240a, 240b are the elongate sides of fastener opening 232. Contact surfaces 240a, 240b are generally flat or planar and extend between the rounded ends of fastener opening 232. Contact surfaces 240a, 240b have a length L2.

In the example shown, the length L1 of fastener 220 is shorter than the length L2 of the contact surfaces 240a, 240b of fastener opening 232. The length L1 of lateral side 238b, which forms a contact surface of fastener 220, distributes the load across the length of fastener 220 and partially across the length of fastener opening 232. The distributed load reduces risks of damage initiation and follow-up damage growth. In addition, a lower number of fasteners 220 can be used to secure composite body 116 to the load body.

Figure 5:
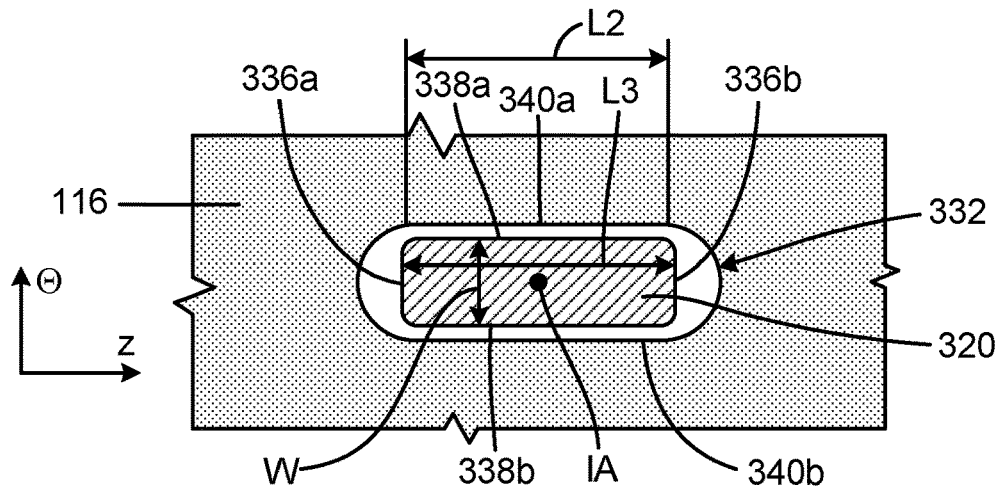
FIG. 5 is a cross-sectional view of a portion of a composite body including a third fastener.

FIG. 5 is a cross-sectional view of composite body 116 and fastener 320. Composite body 116 includes fastener opening 332. Fastener 320 is substantially similar to fastener 120 (FIGS. 3A and 3B) and fastener 220 (FIG. 4) in that fastener 320 has a non-circular cross-sectional shape orthogonal to insertion axis IA.

Fastener 320 includes lateral ends 336a, 336b and lateral sides 338a, 338b. Fastener 320 has a length L3, or longer dimension, and width W, or shorter dimension, with the length L3 being arranged generally perpendicular to the hoop direction Θ.

Fastener opening 332 is substantially similar to fastener opening 132 (FIGS. 3A and 3B) and fastener opening 232 (FIG. 4) in that fastener opening 332 has a non-circular shape about insertion axis IA. Fastener opening 332 is elongate in direction z and perpendicular to hoop direction Θ. Fastener opening 332 includes contact surfaces 340a, 340b that interface with lateral sides 338a, 338b of fastener 332. Contact surfaces 340a, 340b are the elongate sides of fastener opening 332. Contact surfaces 340a, 340b are generally flat or planar and extend between the rounded ends of fastener opening 332. Contact surfaces 340a, 340b have a length L2.

In the example shown, the length L3 of fastener 320 is the same as the length L2 of the contact surfaces 340a, 340b of fastener opening 332. The length L3 of the lateral sides 338a, 338b that form the contact surfaces of fastener 320 distributes the load across the length of fastener 320 and across the full length of the contact areas 340a, 340b of fastener opening 332. The distributed load reduces risks of damage initiation and follow-up damage growth. In addition, a lower number of fasteners 320 can be used to secure composite body 116 to the load body.

Figure 6:
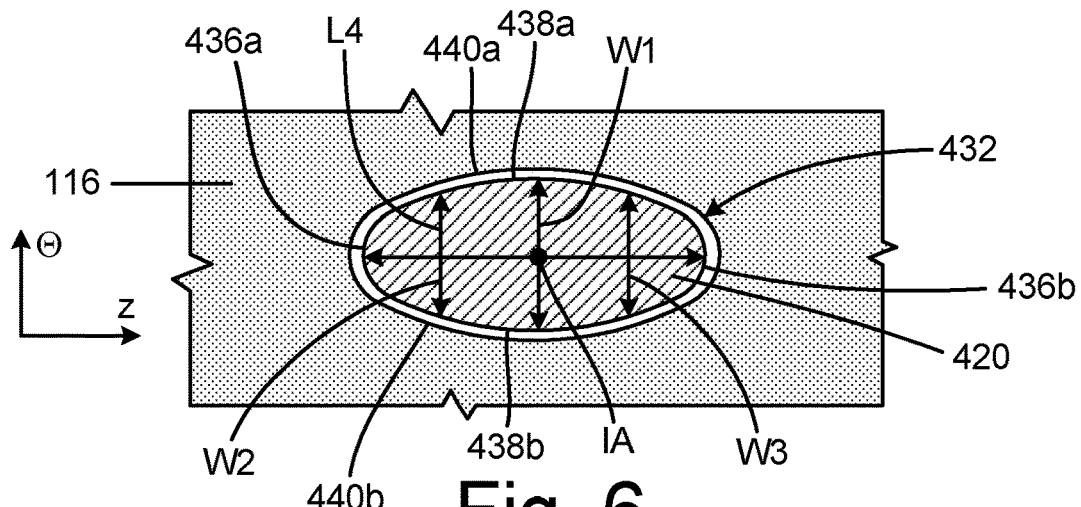
FIG. 6 is a cross-sectional view of a portion of a composite body including a fourth fastener.

FIG. 6 is a cross-sectional view of composite body 116 and fastener 420. Composite body 116 includes fastener opening 432. Fastener 420 is substantially similar to fastener 120 (FIGS. 3A and 3B), fastener 220 (FIG. 4), and fastener 320 (FIG. 5) in that fastener 420 has a non-circular cross-sectional shape orthogonal to insertion axis IA.

Fastener 420 includes lateral ends 436a, 436b and lateral sides 438a, 438b. Fastener 420 has a length L4, or longer dimension, and widths W1, W2, W3, or shorter dimensions, with the length L4 being arranged generally perpendicular to the hoop direction Θ. Lateral sides 436a, 436b are convexly curved sides such that width W1 (approximately at a center point along length L1) is larger than widths W2 and W3 that are spaced laterally from that center point. W2 can be spaced a first lateral distance from lateral end 436a and W3 can be spaced a second lateral distance from lateral send 436b. In some examples, W2 and W3 are the same dimension. In some examples, the first lateral distance is the same as the second lateral distance. In some examples, one or both of lateral sides 438a, 438b have a uniform radius of curvature. In some examples, one or both of lateral sides 438a, 438b have a non-uniform radius of curvature. In other examples, sides 438a, 438b can include flat segments as well.

Fastener opening 432 is substantially similar to fastener opening 132 (FIGS. 3A and 3B), fastener opening 232 (FIG. 4), and fastener opening 332 (FIG. 5) in that fastener opening 432 non-circular shape about insertion axis IA. Fastener opening 432 is elongate in direction z and perpendicular to hoop direction Θ. Fastener opening 432 includes contact surfaces 440a, 440b that interface with lateral sides 438a, 438b of fastener 432. Contact surfaces 440a, 440b are the elongate sides of fastener opening 432. Contact surfaces 440a, 440b are curved similar to lateral sides 438a, 438b to interface with lateral sides 438a, 438b. Contact surfaces 440a, 440b extend between and include portions of the rounded ends of fastener opening 432.

Fastener 420 extends through fastener opening 432. Fastener 420 can contact a full perimeter of fastener opening 432. The curved lateral sides 438a, 438b provide a smooth transition around the outer edge of fastener 420. The smooth curvature of fastener 420 and fastener opening 432 eliminates areas where stress can concentrate, such as an intersection between a generally flat surface and a curved surface. The distributed load reduces risks of damage initiation and follow-up damage growth. In addition, a lower number of fasteners 420 can be used to secure composite body 116 to the load body.

FIG. 7 is a cross-sectional view showing an array 150 of fasteners 120 disposed in fastener openings 132. In the example shown, array 150 includes one row of fasteners 120. The array 150 of fasteners 120 and fastener openings 132 can extend circumferentially around composite body 116. The array 150 of fasteners 120 is configured to secure composite body 116 to another component, such as a metallic or composite load body. Fasteners 120 are oriented such that the major axis A1 is oriented substantially parallel to direction z, which can be representative of the rotational axis of composite body 116. Fasteners 120 are oriented such that the major axis A1 is oriented substantially perpendicular to the hoop direction Θ. The array 150 of fasteners 120 is configured to counteract stresses in configurations where the dominant force load is generally parallel to the hoop direction Θ, such as a torque load applied in direction T. The array 150 of fasteners 120 are oriented such that the major axis A1 is perpendicular to the dominant load applied to composite body 116. While a single array of fasteners 120 is shown, it is understood that composite body 116 can include more than one array of fasteners 120 spaced axially along composite body 116. For example, composite body 116 can include two or more arrays 150. It is further understood that the fastener array can be formed by any one or more of the fasteners discussed herein.

FIG. 8 is a cross-sectional view showing an array 250 of fasteners 120 disposed in fastener openings 132. In the example shown, array 250 includes one row of fasteners 120. The array 250 of fasteners 120 and fastener openings 132 can extend circumferentially around composite body 116. The array 250 of fasteners 120 is configured to secure composite body 116 to another component, such as a metallic load body. Fasteners 120 are oriented such that the major axis A1 is transverse to direction z, which can be representative of the rotational axis of composite body 116. Fasteners 120 are oriented such that the major axis A1 is transverse to the hoop direction Θ.

Major axis A1 is offset from the axis of rotation by angle α. In the example shown, the major axes A1 of each fastener 120 is disposed parallel to the major axes A1 of the other fasteners 120. Angle α can be any desired angle between 0-degrees and 90-degrees, depending on the orientation of the dominant force load. Angle α is configured such that the major axes A1 are substantially perpendicular to the dominant load, as indicated by line DL. In the example shown, each fastener 120 in array 250 is aligned circumferentially about composite body 116. While a single array of fasteners 120 is shown, it is understood that composite body 116 can include more than one array of fasteners 120 spaced axially along composite body 116. For example, composite body 116 can include two or more arrays 250. It is further understood that the fastener array 250 can be formed by any one or more of the fasteners discussed herein.

The array 250 is configured to counteract stresses caused by a combination of torsional loads and axial and/or bending loads applied to composite body 116. Fasteners 120 are oriented to counteract the dominant load formed by the combined loads composite body 116 is subject to.

Figure 9:
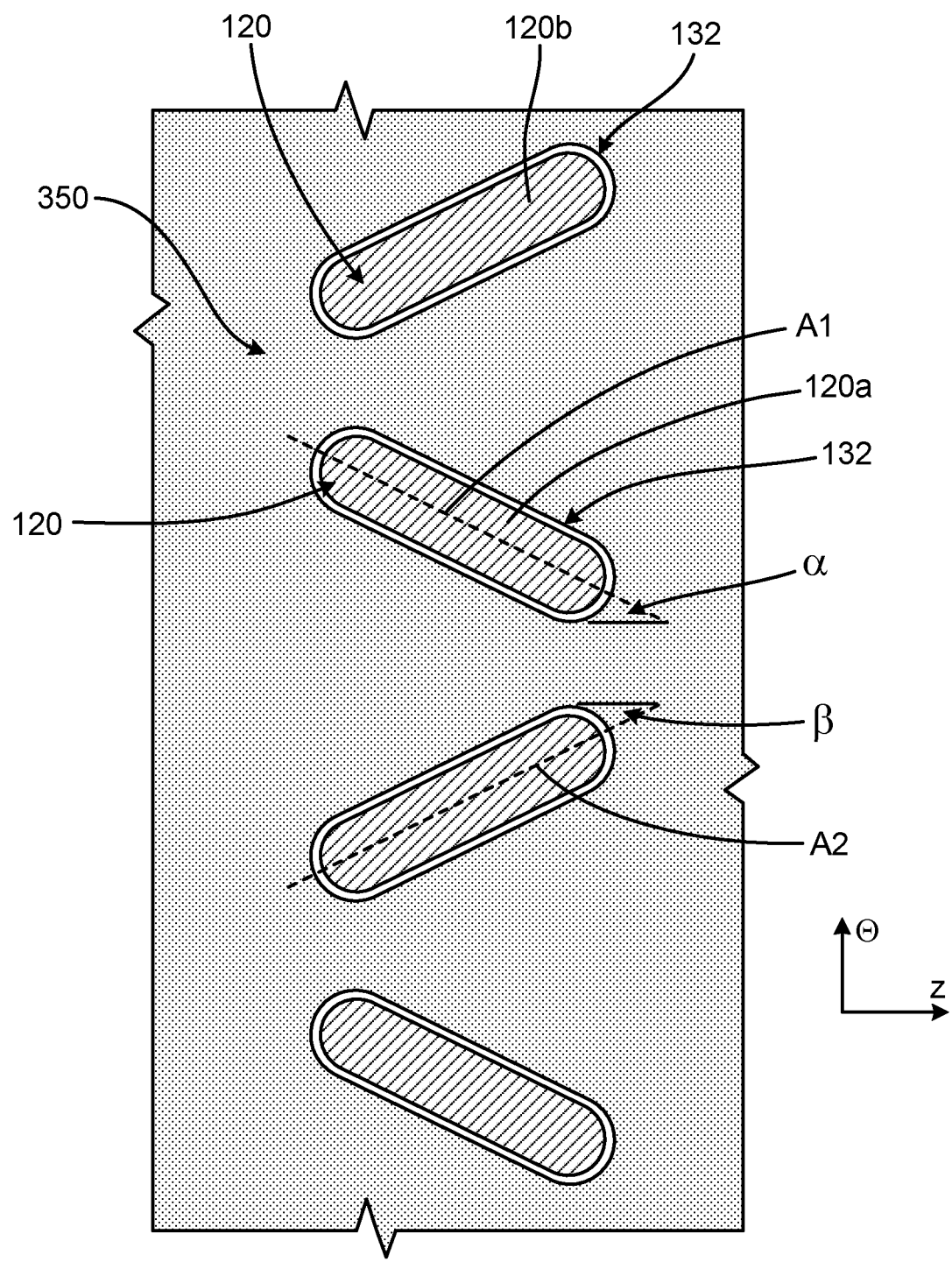
FIG. 9 is a side view of a portion of a composite body including a third arrangement of a plurality of fasteners.

FIG. 9 is a cross-sectional view showing an array 350 of fasteners 120 disposed in fastener openings 132. In the example shown, array 350 includes one row of fasteners 120. The array 350 of fasteners 120 and fastener openings 132 can extend circumferentially around composite body 116. The array 350 of fasteners 120 is configured to secure composite body 116 to another component, such as a metallic load body. Fasteners 120 are oriented such that the major axis is transverse to direction z, which can be representative of the rotational axis of composite body 116. Fasteners 120 are oriented such that the major axes are transverse to the hoop direction Θ. Major axis A1 of fasteners 120a is offset from the axis of rotation by angle α. Major axis A2 of fasteners 120b is offset from the axis of rotation by angle β. In the example shown, the major axes A1 of each fastener 120a is disposed parallel to the major axes A1 of other fasteners 120a. In the example shown, the major axes A2 of each fastener 120b is disposed parallel to the major axes A2 of other fasteners 120b. The major axes A1 of fasteners 120a are transverse to the major axes A2 of fasteners 120b.

Angles α and β can be any desired angle between 0-degrees and 90-degrees, depending on the orientation of the dominant force load. In some examples, angle α is the same as angle β. In the example shown, each fastener 120 in array 350 is aligned circumferentially about composite body 116. While a single array 350 of fasteners 120 is shown, it is understood that composite body 116 can include more than one array of fasteners 120 spaced axially along composite body 116. For example, composite body 116 can include two or more arrays 350. It is further understood that the fastener array can be formed by any one or more of the fasteners discussed herein.

The array 350 is configured to counteract stresses caused by a combination of torsional loads and axial and/or bending loads applied to composite body 116. Fasteners 120 are oriented to counteract the dominant load formed by the combined loads composite body 116 is subject to. The opposing angular orientations of fasteners 120a and fasteners 120b facilitate counteracting axial loads in both axial directions.

The arrangements of fasteners shown in FIGS. 7-9 illustrate one row of fasteners 120 in the circumferential direction. It is understood that, in other examples, more than one row of fasteners 120 can be arranged. Different rows of fasteners 120 can be arranged in the same or different manners and can be shifted with respect to each other in the circumferential direction.

Figure 10:
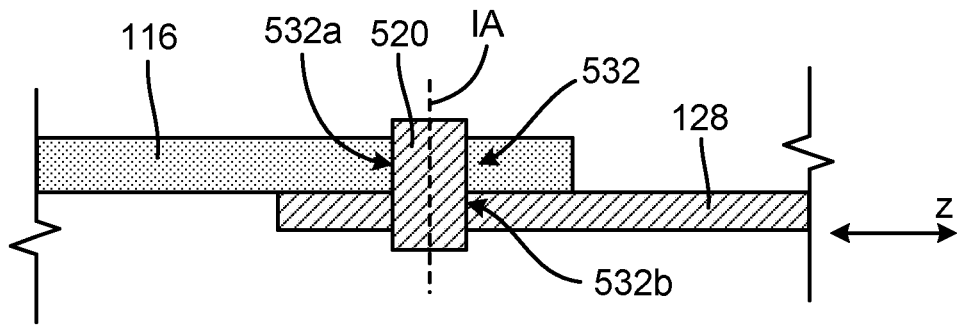
FIG. 10 is a cross-sectional view of a joint connecting a composite part and a metallic part with a fastener.

FIG. 10 is a cross-sectional view showing fastener 520 securing composite body 116 and sleeve 128 together. Sleeve 128 can be similar to diaphragm shaft 28 (FIG. 1B) and can be metallic or composite. Sleeve 128 is disposed radially inside of composite body 116. Sleeve 128 forms a load body of the assembly. Fastener 520, which is substantially similar to fasteners 120 (best seen in FIGS. 3A and 3B), 220 (FIG. 4), 320 (FIG. 5), 420 (FIG. 6), and includes a non-circular cross-sectional shape orthogonal to insertion axis IA. Fastener 520 extends through fastener opening 532, which includes first opening 532a through composite body 116 and second opening 532b through sleeve 128. Fastener opening 532 is non-circular about insertion axis IA. Fastener 520 secures composite body 116 and sleeve 128 together and is configured to transfer loads, such as torque and/or axial and/or bending loads, therebetween.

Figure 11:
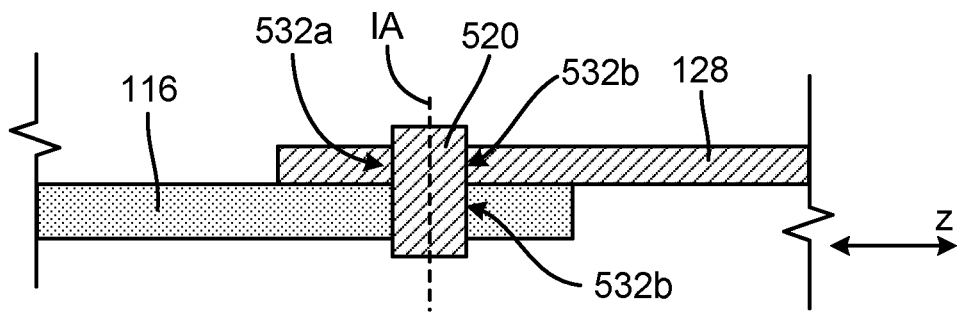
FIG. 11 is a cross-sectional view of a joint connecting a composite part and a metallic part with a fastener.

FIG. 11 is a cross-sectional view showing fastener 520 securing composite body 116 and sleeve 128 together. Sleeve 128 can be similar to diaphragm shaft 28 (FIG. 1B) and can be metallic or composite. Sleeve 128 is disposed radially outside of composite body 116. Sleeve 128 forms a load body of the assembly. Fastener 520, which is substantially similar to fasteners 120 (best seen in FIGS. 3A and 3B), 220 (FIG. 4), 320 (FIG. 5), 420 (FIG. 6), includes a non-circular cross-sectional shape orthogonal to insertion axis IA. Fastener 520 extends through fastener opening 532, which includes first opening 532a through composite body 116 and second opening 532b through sleeve 128. Fastener opening 532 is non-circular about insertion axis IA. Fastener 520 secures composite body 116 and sleeve 128 together and is configured to transfer loads, such as torque and/or axial and/or bending loads, therebetween.

Figure 12:
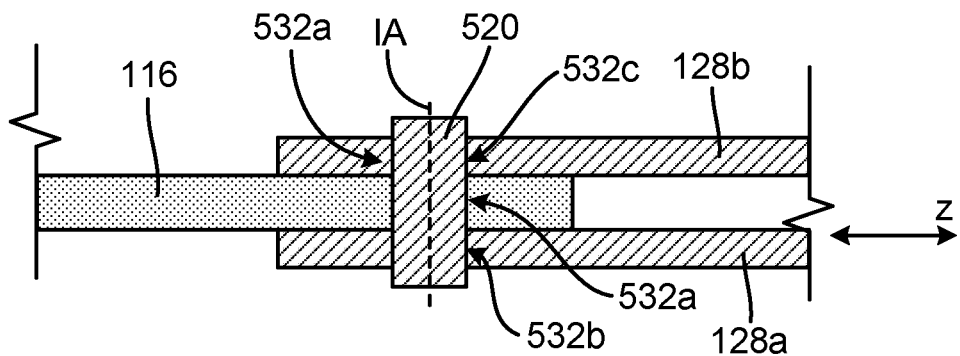
FIG. 12 is a cross-sectional view of a joint connecting a composite part and two metallic parts with a fastener.

FIG. 12 is a cross-sectional view showing fastener 520 securing composite body 116 and sleeves 128a, 128b together. Sleeves 128a, 128b can be similar to diaphragm shaft 28 (FIG. 1B), and can be metallic or composite. Sleeve 128a is disposed radially inside of composite body 116 and sleeve 128b is disposed radially outside of composite body 116. Sleeves 128a, 128b form support bodies of the assembly. As such, at least a portion of composite body 116 is sandwiched between the two sleeves 128a, 128b. Fastener 520, which is substantially similar to fasteners 120 (best seen in FIGS. 3A and 3B), fasteners 220 (FIG. 4), fasteners 320 (FIG. 5), fasteners 420 (FIG. 6), includes a non-circular cross-sectional shape orthogonal to insertion axis IA. Fastener 520 extends through fastener opening 532, which includes first opening 532a through composite body 116, second opening 532b through sleeve 128a, and third opening 532c through sleeve 128b. Fastener 520 secures composite body 116 and sleeves 128a, 128b together and is configured to transfer loads, such as torque and/or axial and/or bending loads, therebetween.

Figure 13:
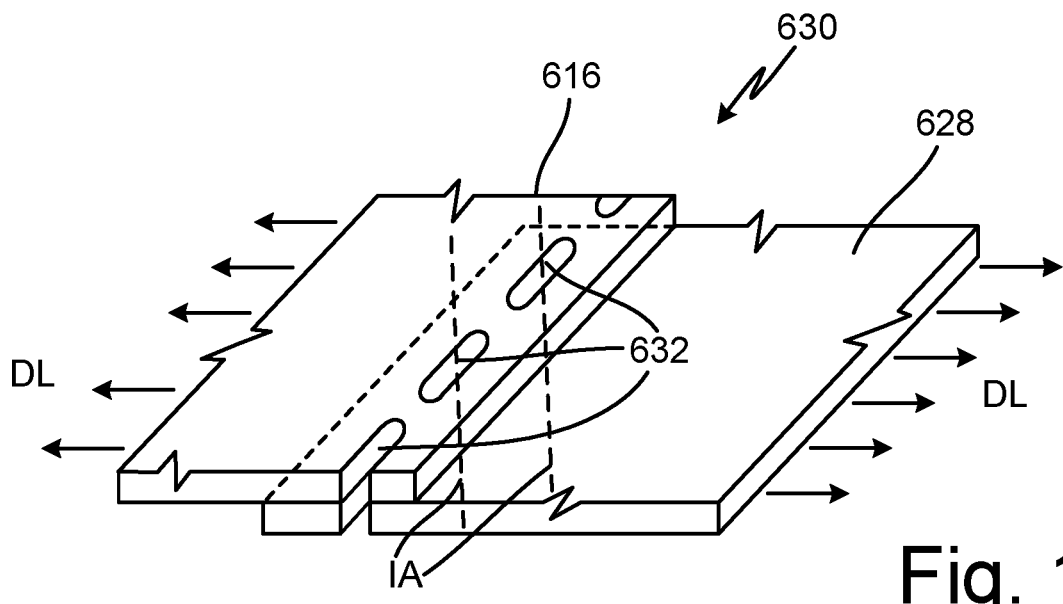
FIG. 13 is an isometric view of a joint assembly having a composite body and a load body fastened together.

FIG. 13 is an isometric view showing joint assembly 630. Joint assembly 630 is formed by composite body 616 fastened to load body 628 by fasteners extending through fastener openings 632. Joint assembly 630 can be considered to be a force transmission assembly. Fastener openings 632 extend through each of composite body 116 and load body 228. Composite body 616 can be formed by a composite sheet, tube, or shaft. Load body 628 can be formed by a mating component, such as a composite or metallic sheet, tube, or shaft. For example, composite body 616 can be a substantially planar sheet and load body 628 can similarly be formed as a substantially planar sheet.

Fastener opening 632 is substantially similar to fastener opening 132 (best seen in FIG. 3A), fastener opening 232 (FIG. 4), fastener opening 332 (FIG. 5), and fastener opening 432 (FIG. 6). Fastener opening 632 has a non-circular shape about insertion axis IA.

Fasteners, such as fasteners 120 (FIGS. 3A, 3B, and 7-9), fasteners 220 (FIG. 4), fasteners 320 (FIG. 5), and fasteners 520 (FIGS. 10-12), are disposed in fastener openings 632 to join composite body 616 and load body 228 together, thereby forming joint assembly 630. The fasteners have non-circular cross-sections taken orthogonal to insertion axis IA to facilitate engagement of the fasteners within fastener openings 632. The major axes of fastener openings 632 and the corresponding fasteners are disposed substantially perpendicular to the direction of the dominant load DL.

Figure 14:
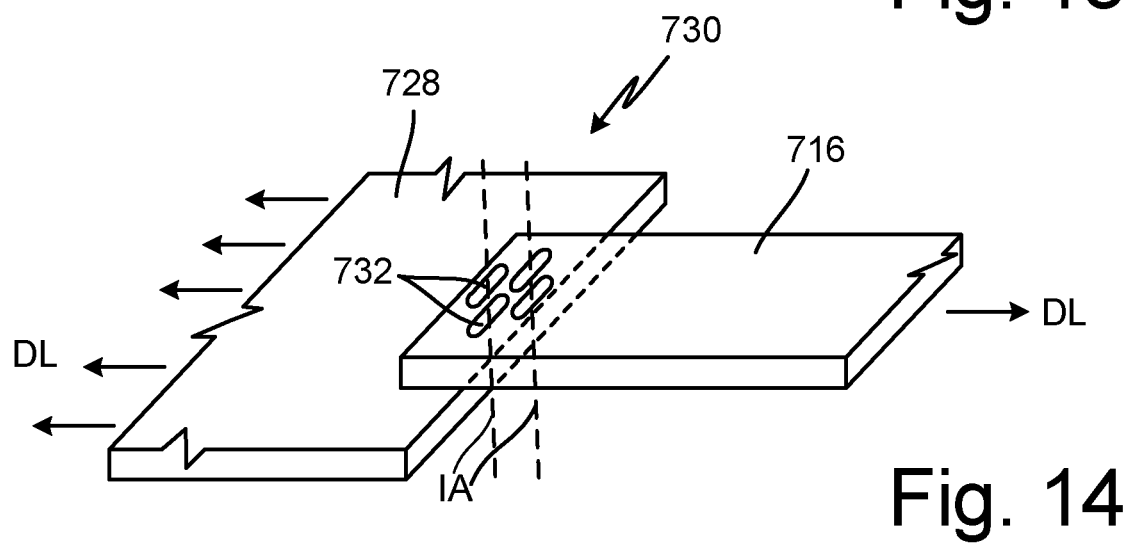
FIG. 14 is an isometric view of a joint assembly having a composite body and a load body fastened together.

FIG. 14 is an isometric view showing joint assembly 730. Joint assembly 730 is formed by composite body 716 fastened to load body 728 by fasteners extending through fastener openings 732. Joint assembly 730 is substantially similar to joint assembly 630 (FIG. 13) in that non-circular fasteners extend through non-circular fastener openings 732 to join a composite body 716 to a load body 728. Joint assembly 730 can be considered to be a force transmission assembly. One difference of joint assembly 730 in comparison with joint assembly 630 is in that composite body 716 has a width smaller than the width of load body 728. The major axes of fastener openings 732 and the corresponding fasteners are disposed substantially perpendicular to the direction of the dominant load DL.

Fastener openings 732 extend through each of composite body 716 and load body 728. Composite body 716 can be formed by a beam. Load body 728 forms by a mating shell component, such as a sheet or beam. Composite body 716 can be substantially planar and can have a smaller width than load body 728.

Figure 15:
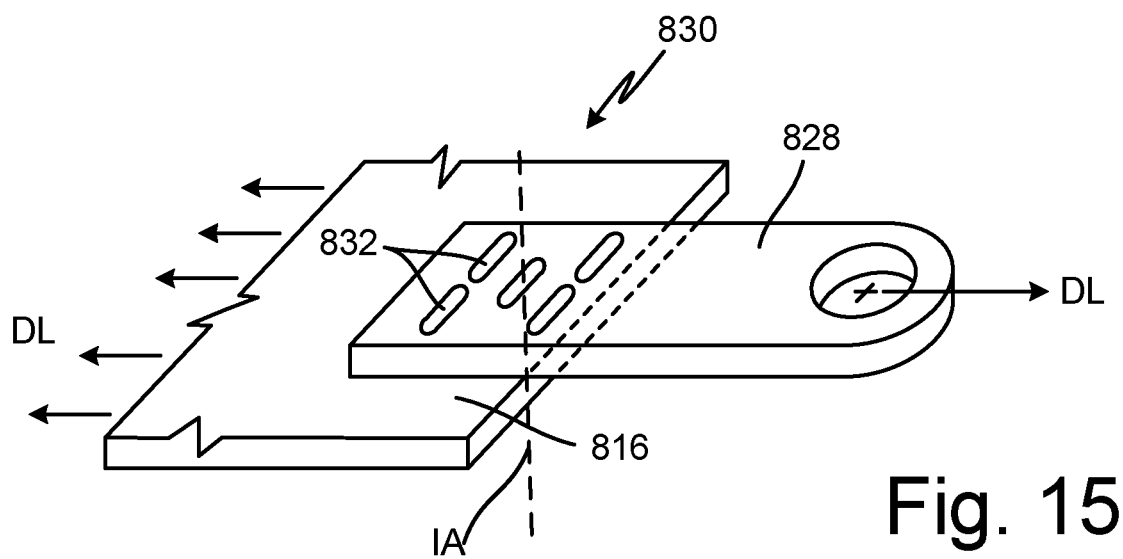
FIG. 15 is an isometric view of a joint assembly having a composite body and a load body fastened together.

FIG. 15 is an isometric view showing joint assembly 830. Joint assembly 830 is formed by composite body 816 fastened to load body 828 by fasteners extending through fastener openings 832. Joint assembly 830 is substantially similar to joint assembly 630 (FIG. 13) and joint assembly 730 (FIG. 14) in that non-circular fasteners extend through non-circular fastener openings 832 to join a composite body 816 to a load body 828. Joint assembly 830 can be considered to be a force transmission assembly. One difference of joint assembly 830 in comparison with joint assembly 630 or joint assembly 730 is that the width of composite body 816 is larger than the width of load body 828. The major axes of fastener openings 832 and the corresponding fasteners are disposed substantially perpendicular to the direction of the dominant force load DL.

Fastener openings 832 extend through each of composite body 816 and load body 828. Load body 828 can be formed by any desired element supportable by the composite body 816. For example, load body 828 can be formed by a lag component, among other options. Composite body 816 can form a mating shell component, such as a sheet or beam. Load body 828 can be substantially planar and can have a smaller width than composite body 816

Figure 16:
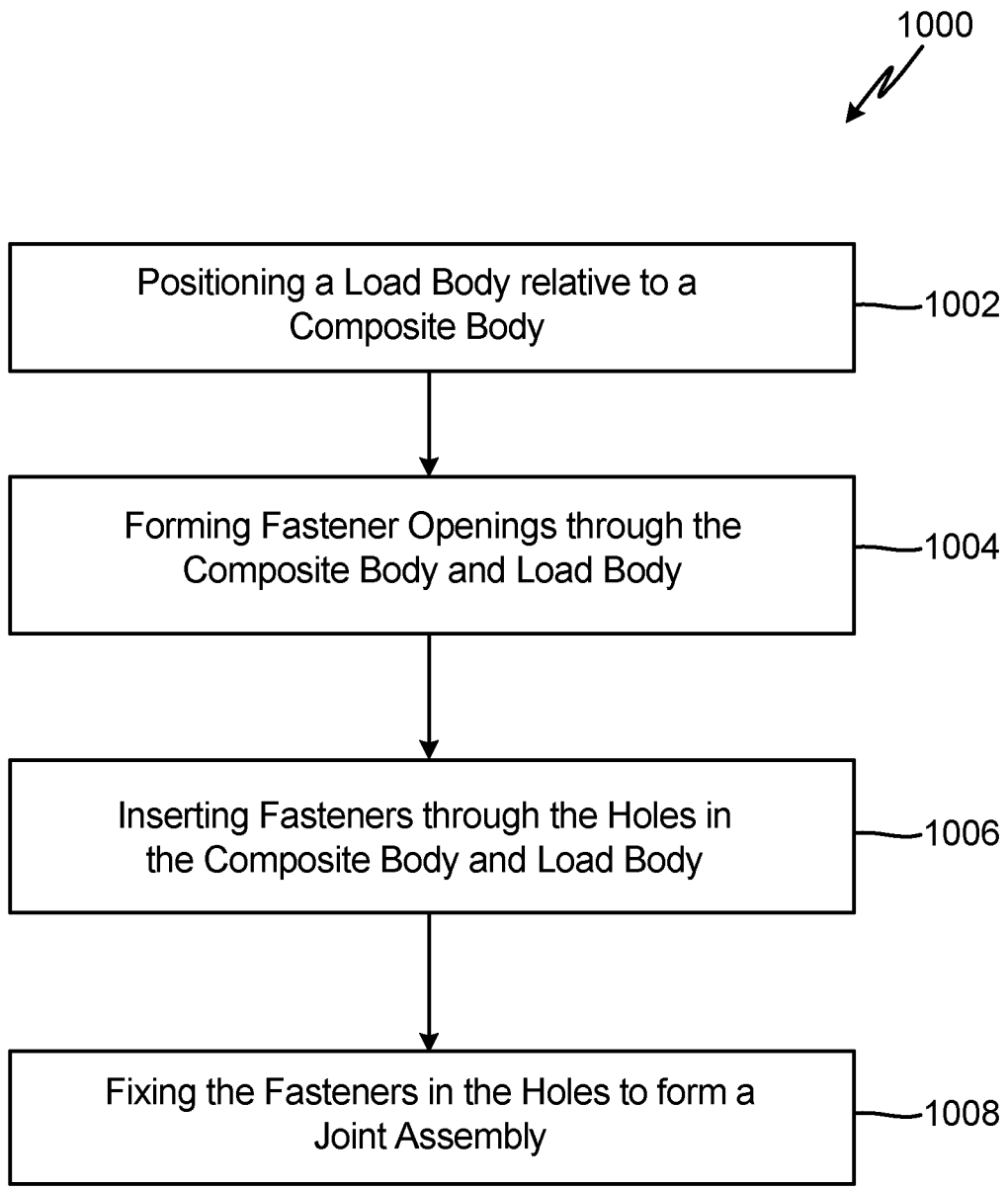
FIG. 16 is a flow chart showing a method of forming a joint assembly for a composite body.

FIG. 16 is a flowchart showing method 1000 of forming a joint assembly. For example, the joint assembly can be used to form a driveshaft, single and double shear connection of composite and metallic shells (e.g., as shown in FIG. 13), connection between composite elements and metallic shell (e.g., as shown in FIG. 14), connection between metallic parts and composite shells (e.g., as shown, in FIG. 15), or other force transferring joint between a composite body and a second body. The second load body can be formed from composite or metal. In step 1002, one of the composite body, such as composite body 116 (FIGS. 3A-12), composite body 616 (FIG. 13), composite body 716 (FIG. 14), and composite body 816 (FIG. 15), and a load body, such as diaphragm shaft 28 (FIG. 1B), sleeves 128 (FIGS. 10 and 11), or sleeves 128a, 128b (FIG. 12), load body 628 (FIG. 13), load body 728 (FIG. 14), and load body 828 (FIG. 15), is positioned relative the other one of the composite body and load body. The composite body and load body can be positioned in an operating position. The operating position places the composite body and load body in their desired positions relative to each other for during operation. In examples where the joint assembly is for shafts, such as driveshafts, one of the composite shaft and the metallic or composite sleeve can be inserted into the other one of the composite body and the sleeve. It is understood that the sleeve can be metallic or composite.

In step 1004, non-circular fastener openings are formed through the composite body and the load body. The non-circular fastener openings can be oblong openings. The non-circular fastener openings can be formed in any desired manner. In some examples, multiple openings, such as two or more, can be formed by drilling, either mechanical or laser, and connected together by removing material from between the multiple openings to form a continuous fastener opening. In some examples, the fastener opening can be formed by horizontal end milling. In some examples, the fastener opening can be formed by computer numerical control (CNC) machining. In some examples, the fastener opening can be formed by stamping.

The fastener openings can be formed simultaneously through the composite body and the load body. For example, the fastener openings can be formed though the composite body and the load body after the composite body and load body are positioned relative each other. While the fastener openings are described as formed simultaneously through the composite body and the load body after relative positioning, it is understood that steps 1002 and 1004 can be performed in any desired order. For examples, a first set of fastener openings can be formed in one of the composite body and the load body and a second set of mating fastener openings can be formed in the other one of the composite body and the load body prior to positioning the components relative each other. The openings can be aligned after relative positioning.

In step 1006, non-circular fasteners, such as fasteners 120 (best seen in FIGS. 3A and 3B), fasteners 220 (FIG. 4), fasteners 320 (FIG. 5), fasteners 420 (FIG. 6), fasteners 520 (FIGS. 10-12) are inserted through the fastener openings. In step 1008, the fasteners are fixed in position within the fastener openings to secure the composite body and the load body together and form the joint assembly.

Discussion of Possible Embodiments

The following are non-exclusive descriptions of possible embodiments of the present invention.

An assembly includes a composite body elongate along a body axis having a first fastener opening extending radially therethrough; a first load body having a second fastener opening extending therethrough; and a first fastener extending along an insertion axis through the first fastener opening and the second fastener opening to connect the composite body and the first load body together, the first fastener configured to transmit forces therebetween. The first fastener has a non-circular cross-section orthogonal to the insertion axis.

The assembly of the preceding paragraph can optionally include, additionally and/or alternatively, any one or more of the following features, configurations and/or additional components:

The first fastener fully contacts a perimeter of the first opening.

The first fastener opening is non-circular about the insertion axis and a shape of the first fastener opening is the same as a shape of the non-circular cross-section of the first fastener.

The first fastener partially contacts a perimeter of the first opening.

The first fastener includes a first lateral side extending between a first lateral end and a second lateral end and a second lateral side extending between the first lateral end and the second lateral end, and wherein a length between the first lateral end and the second lateral end is greater than a width between the first lateral side and the second lateral side.

The first lateral side is planar at an interface with the first fastener opening.

The second lateral side is convexly curved between the first lateral side and the second lateral side.

The first fastener includes a major axis extending between the first lateral end and the second lateral end, and wherein the major axis is aligned with the body axis.]

A second fastener including a third lateral side extending between a third lateral end and a fourth lateral end and a fourth lateral side extending between the third lateral end and the fourth lateral end, and wherein a length between the third lateral end and the fourth lateral end is greater than a width between the third lateral side and the fourth lateral side. The second fastener extends through the composite tube and the load body at a location circumferentially spaced from the first fastener. The second fastener includes a second major axis extending between the third lateral end and the fourth lateral end.

The second major axis is transverse to the first major axis.

The first load body is metallic.

The first load body is disposed radially inside of the composite tube relative the body axis at a location where the first fastener extends through the first load body and the composite tube.

The first load body is disposed radially outside of the composite tube relative the body axis at a location where the first fastener extends through the first load body and the composite tube.

A second load body including a third fastener opening therethrough, wherein the first fastener further extends through the third fastener opening to connect the second load body to the composite body. The first load body is disposed radially inside of the composite tube relative the body axis at a location where the first fastener extends through the first load body, the composite tube, and the second load body. The second load body is disposed radially outside of the composite tube relative the body axis at the location where the first fastener extends through the first load body, the composite tube, and the second load body.

A plurality of first fastener openings extending circumferentially about the composite tube. A plurality of second fastener openings extending circumferentially about the load body. A plurality of first fasteners disposed in a circumferential array about the body axis and extending through the plurality of first fastener openings and second fastener openings.

A method of making a shaft assembly includes inserting one of a metallic load body and a composite body into the other one of the metallic load body and the composite body; forming a plurality of non-circular openings in the composite body and in the metallic load body; installing one of a plurality of fasteners along an insertion axis and through each opening of the plurality of openings through the composite body and the metallic load body each corresponding opening of the metallic load body, wherein each of the plurality of fasteners has a non-circular cross-sectional shape orthogonal to the insertion axis; and fixing the fasteners to secure the composite body to the metallic load body.

The method of the preceding paragraph can optionally include, additionally and/or alternatively, any one or more of the following features, configurations and/or additional components:

Performing the step inserting one of the metallic load body and the composite body into the other one of the metallic load body and the composite body prior to performing the step of forming the plurality of non-circular openings in the composite body and in the metallic load body.

Forming a plurality of oblong openings in the composite body and in the metallic load body, wherein each oblong opening includes a length larger than a width, and wherein an opening axis along the length is aligned with a body axis of the composite body.

Forming a plurality of oblong openings in the composite body and in the metallic load body, wherein each oblong opening includes a length larger than a width, and wherein an opening axis along the length is transverse to a body axis of the composite body.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A joint assembly comprising:
a composite body having a first fastener opening extending therethrough;
a first load body having a second fastener opening extending therethrough; and
a first fastener extending along an insertion axis through the first fastener opening and the second fastener opening to connect the composite body and the first load body together, the first fastener configured to transmit forces therebetween;
a second fastener extending along an insertion axis through the composite body and the first load body at a location circumferentially spaced from the first fastener;
wherein the first fastener has a non-circular cross-section orthogonal to the insertion axis;
wherein the first fastener includes a first lateral side extending between a first lateral end and a second lateral end, and a second lateral side extending between the first lateral end and the second lateral end;
wherein the second fastener includes a third lateral side extending between a third lateral end and a fourth lateral end, and a fourth lateral side extending between the third lateral end and the fourth lateral end; and
wherein a length between the first lateral end and the second lateral end is greater than a maximum width between the first lateral side and the second lateral side and a length between the third lateral end and the fourth lateral end is greater than a maximum width between the third lateral side and the fourth lateral side.

2. The assembly of claim 1, wherein the first fastener opening is non-circular about the insertion axis and a shape of the first fastener opening is the same as a shape of the non-circular cross-section of the first fastener.

3. The assembly of claim 1, wherein the first fastener partially contacts a perimeter of the first opening.

4. The assembly of claim 1, wherein the first lateral side is planar at an interface with the first fastener opening.

5. The assembly of claim 1, wherein the first lateral side is convexly curved between the first lateral end and the second lateral end.

6. The assembly of claim 5, wherein the second lateral side is convexly curved between the first lateral end and the second lateral end.

7. The assembly of claim 1, wherein the first fastener includes a major axis extending between the first lateral end and the second lateral end, and wherein the major axis is aligned with the body axis.

8. The assembly of claim 1, wherein the first fastener includes a first major axis extending between the first lateral end and the second lateral end, and wherein the first major axis is transverse to the body axis.

9. The assembly of claim 8:
wherein the second fastener includes a second major axis extending between the third lateral end and the fourth lateral end.

10. The assembly of claim 1, wherein the composite body is a composite shaft and the first load body is a metallic sleeve.

11. The assembly of claim 1, wherein the first load body is disposed radially inside of the composite body relative the body axis at a location where the first fastener extends through the first load body and the composite tube.

12. The assembly of claim 1, wherein the first load body is disposed radially outside of the composite body relative the body axis at a location where the first fastener extends through the first load body and the composite body.

13. The assembly of claim 1, further comprising:
a second load body including a third fastener opening therethrough, wherein the first fastener further extends through the third fastener opening to connect the second load body to the composite body;
wherein the first load body is disposed radially inside of the composite body relative the body axis at a location where the first fastener extends through the first load body, the composite body, and the second load body; and
wherein the second load body is disposed radially outside of the composite body relative the body axis at the location where the first fastener extends through the first load body, the composite body, and the second load body.

14. The assembly of claim 1, further comprising:
a plurality of first fastener openings extending circumferentially about the composite body;

a plurality of second fastener openings extending circumferentially about the load body; and a plurality of first fasteners disposed in a circumferential array about the body axis and extending through the plurality of first fastener openings and the plurality of second fastener openings.

15. A method of joining a composite body and a load body, the method comprising:

aligning the load body relative to the composite body;

forming a first fastener opening in the composite body;

forming a second fastener opening in the load body;

installing a first fastener extending along an insertion axis through the first fastener opening and the second fastener opening to connected the composite body and the load body together, the first fastener configured to transmit forces therebetween;

installing a second fastener extending along an insertion axis through the composite body and the first load body at a location circumferentially spaced from the first fastener;

wherein the first fastener has a non-circular cross-section orthogonal to the insertion axis;

wherein the first fastener includes a first lateral side extending between a first lateral end and a second lateral end, and a second lateral side extending between the first lateral end and the second lateral end;

wherein the second fastener includes a third lateral side extending between a third lateral end and a fourth lateral end, and a fourth lateral side extending between the third lateral end and the fourth lateral end; and wherein a length between the first lateral end and the second lateral end is greater than a maximum width between the first lateral side and the second lateral side and a length between the third lateral end and the fourth lateral end is greater than a maximum width between the third lateral side and the fourth lateral side.

16. The method of claim 15, further comprising:

inserting one of a metallic sleeve forming the load body and a composite shaft forming the composite body into the other one of the metallic sleeve and the composite shaft prior to forming the plurality of non-circular openings in the composite shaft and in the metallic sleeve.

17. The method of claim 15, wherein forming the plurality of non-circular openings in the composite body and in the load body comprises:

forming a plurality of oblong openings in the composite body and in the load body, wherein each oblong opening includes a length larger than a width, and wherein an opening axis along the length is aligned with a body axis of the composite body.

18. The method of claim 15, wherein forming the plurality of non-circular openings in the composite body and in the load body comprises:

forming a plurality of oblong openings in the composite body and in the load body, wherein each oblong opening includes a length larger than a width, and wherein an opening axis along the length is transverse to a body axis of the composite body.

19. The method of claim 15, wherein:

the first fastener includes a first major axis extending between the first lateral end and the second lateral end, and wherein the first major axis is transverse to the body axis; and the second fastener includes a second major axis extending between the third lateral end and the fourth lateral end, and the second major axis is transverse to the first major axis.

20. A joint assembly comprising:

a composite body having a first fastener opening extending therethrough;

a first load body having a second fastener opening extending therethrough; and a first fastener extending along an insertion axis through the first fastener opening and the second fastener opening to connect the composite body and the first load body together, the first fastener configured to transmit forces therebetween;

a second fastener extending along an insertion axis through the composite body and the first load body at a location circumferentially spaced from the first fastener;

wherein the first fastener has a non-circular cross-section orthogonal to the insertion axis, the first fastener includes a first lateral side extending between a first lateral end and a second lateral end, and a second lateral side extending between the first lateral end and the second lateral end, and the first fastener includes a first major axis extending between the first lateral end and the second lateral end, and wherein the first major axis is transverse to the body axis;

wherein the second fastener includes a third lateral side extending between a third lateral end and a fourth lateral end, and a fourth lateral side extending between the third lateral end and the fourth lateral end, the second fastener includes a second major axis extending between the third lateral end and the fourth lateral end, and the second major axis is transverse to the first major axis;

wherein a length between the first lateral end and the second lateral end is greater than a maximum width between the first lateral side and the second lateral side and a length between the third lateral end and the fourth lateral end is greater than a maximum width between the third lateral side and the fourth lateral side.

* * * * *